United States Patent
Liu et al.

(10) Patent No.: US 11,449,751 B2
(45) Date of Patent: Sep. 20, 2022

(54) TRAINING METHOD FOR GENERATIVE ADVERSARIAL NETWORK, IMAGE PROCESSING METHOD, DEVICE AND STORAGE MEDIUM

(71) Applicant: BOE TECHNOLOGY GROUP CO., LTD., Beijing (CN)

(72) Inventors: Hanwen Liu, Beijing (CN); Dan Zhu, Beijing (CN); Pablo Navarrete Michelini, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 136 days.

(21) Appl. No.: 16/759,669

(22) PCT Filed: Sep. 25, 2019

(86) PCT No.: PCT/CN2019/107761
§ 371 (c)(1),
(2) Date: Apr. 27, 2020

(87) PCT Pub. No.: WO2020/063648
PCT Pub. Date: Apr. 2, 2020

(65) Prior Publication Data
US 2020/0285959 A1    Sep. 10, 2020

(30) Foreign Application Priority Data

Sep. 30, 2018 (CN) .......................... 201811155147.2
Sep. 30, 2018 (CN) .......................... 201811155252.6
(Continued)

(51) Int. Cl.
*G06N 3/08* (2006.01)
*G06N 3/04* (2006.01)
(Continued)

(52) U.S. Cl.
CPC ............. *G06N 3/08* (2013.01); *G06K 9/6232* (2013.01); *G06K 9/6257* (2013.01);
(Continued)

(58) Field of Classification Search
CPC ... G06T 3/40–4092; G06T 2207/20081; G06T 2207/20084; G06T 5/002;
(Continued)

(56) References Cited

U.S. PATENT DOCUMENTS 5,754,697 A    5/1998 Fu et al.
5,781,196 A    7/1998 Streater
(Continued)

FOREIGN PATENT DOCUMENTS

CN    101593269 A    12/2009
CN    101872472 A    10/2010
(Continued)

OTHER PUBLICATIONS

Wang, Xintao, et al. "ESRGAN: Enhanced Super-Resolution Generative Adversarial Networks." arXiv preprint arXiv:1809.00219v2 (2018). (Year: 2018).*

(Continued)

*Primary Examiner* — Geoffrey E Summers
(74) *Attorney, Agent, or Firm* — Nath, Goldberg & Meyer; Joshua B. Goldberg (57) ABSTRACT

The present disclosure provides a training method for generative adversarial network, which includes: extracting a first-resolution sample image from a second-resolution sample image; separately providing a first input image and a second input image for a generative network to generate a first output image and a second output image respectively, the first input image including a first-resolution sample image and a first noise image, the second input image including the first-resolution sample image and a second (Continued)

noise image; separately providing the first output image and a second-resolution sample image for a discriminative network to output a first discrimination result and a second discrimination result; and adjusting parameters of the generative network to reduce a loss function. The present disclosure further provides an image processing method using the generative adversarial network, a computer device, and a computer-readable storage medium.

14 Claims, 2 Drawing Sheets

(30) Foreign Application Priority Data

Sep. 30, 2018 (CN) .......................... 201811155326.6
Sep. 30, 2018 (CN) .......................... 201811155930.9

(51) Int. Cl.
*G06T 3/40* (2006.01)
*G06K 9/62* (2022.01)
*G06T 5/00* (2006.01)
*G06T 5/50* (2006.01)
*G06V 10/75* (2022.01)

(52) U.S. Cl.
CPC ......... *G06K 9/6268* (2013.01); *G06N 3/0454* (2013.01); *G06N 3/0481* (2013.01); *G06N 3/088* (2013.01); *G06T 3/4007* (2013.01); *G06T 3/4046* (2013.01); *G06T 3/4076* (2013.01); *G06T 5/002* (2013.01); *G06T 5/50* (2013.01); *G06V 10/751* (2022.01); *G06T 2207/20081* (2013.01); *G06T 2207/20084* (2013.01); *G06T 2207/20212* (2013.01)

(58) Field of Classification Search
CPC ............ G06T 5/50; G06T 2207/20212; G06N 3/02–088; G06K 9/6232; G06K 9/6257; G06K 9/6268; G06K 9/62; G06K 9/00; G06V 10/751; G06V 10/454; G06V 10/82; G06V 10/10; G06V 10/20; G06V 30/19013; G06V 30/18057; G06V 10/7715; G06V 30/19127; G06V 10/7747; G06V 30/19147; G06V 10/764; G06V 30/19173; G06F 17/16
See application file for complete search history.

(56) References Cited

U.S. PATENT DOCUMENTS

| | | | |
|---|---|---|---|
| 6,766,067 | B2 | 7/2004 | Freeman et al. |
| 8,675,999 | B1 | 3/2014 | Liang et al. |
| 9,727,959 | B2 | 8/2017 | Meyers et al. |
| 9,865,036 | B1 | 1/2018 | Liu et al. |
| 10,430,683 | B2 | 10/2019 | Liu et al. |
| 2012/0328210 | A1 | 12/2012 | Fattal et al. |
| 2013/0301933 | A1 | 11/2013 | Salvador et al. |
| 2015/0235345 | A1 | 8/2015 | Liu |
| 2015/0296232 | A1 | 10/2015 | Hwang et al. |
| 2017/0178293 | A1 | 6/2017 | Salvador Marcos et al. |
| 2017/0365038 | A1 | 12/2017 | Denton et al. |
| 2018/0075581 | A1* | 3/2018 | Shi ..................... G06T 3/4046 |
| 2018/0240257 | A1 | 8/2018 | Li et al. |
| 2019/0005619 | A1 | 1/2019 | Michelini et al. |
| 2019/0114742 | A1* | 4/2019 | Wang ................. G06T 5/002 |
| 2019/0129858 | A1 | 5/2019 | Liu et al. |
| 2019/0156201 | A1 | 5/2019 | Bichler et al. |
| 2019/0302290 | A1 | 10/2019 | Alwon |
| 2019/0333198 | A1 | 10/2019 | Wang et al. |
| 2019/0333199 | A1 | 10/2019 | Ozacan et al. |
| 2019/0370608 | A1* | 12/2019 | Lee .................... G06K 9/6262 |
| 2020/0034948 | A1* | 1/2020 | Park .................... G06N 3/0481 |

FOREIGN PATENT DOCUMENTS

| | | |
|---|---|---|
| CN | 102915527 A | 2/2013 |
| CN | 103426148 A | 12/2013 |
| CN | 103514580 A | 1/2014 |
| CN | 103903236 A | 7/2014 |
| CN | 104853059 A | 8/2015 |
| CN | 105144232 A | 12/2015 |
| CN | 103903236 B | 8/2016 |
| CN | 105975931 A | 9/2016 |
| CN | 105975968 A | 9/2016 |
| CN | 105976318 A | 9/2016 |
| CN | 107133601 A | 9/2017 |
| CN | 107154023 A | 9/2017 |
| CN | 107369189 A | 11/2017 |
| CN | 107527044 A | 12/2017 |
| CN | 107766860 A | 3/2018 |
| CN | 107767343 A | 3/2018 |
| CN | 107977932 A | 5/2018 |
| CN | 108052940 A | 5/2018 |
| CN | 108122197 A | 6/2018 |
| CN | 108154499 A | 6/2018 |
| CN | 108268870 A | 7/2018 |
| CN | 108334848 A | 7/2018 |
| CN | 108416428 A | 8/2018 |
| CN | 108476291 A | 8/2018 |
| CN | 108596830 A | 9/2018 |
| CN | 109255390 A | 1/2019 |
| CN | 109345455 A | 2/2019 |
| CN | 109345456 A | 2/2019 |
| CN | 109360151 A | 2/2019 |
| RU | 2635883 C1 | 11/2017 |
| WO | 02089046 A1 | 11/2002 |
| WO | 03060823 A2 | 7/2003 |
| WO | 2017100903 A1 | 6/2017 |
| WO | 2018086354 A1 | 5/2018 |

OTHER PUBLICATIONS

Blau, Yochai, and Tomer Michaeli. "The Perception-Distortion Tradeoff." arXiv preprint arXiv:1711.06077v2 (2018). (Year: 2018).*
Chen, Li, et al. "Joint denoising and super-resolution via generative adversarial training." 2018 24th International Conference on Pattern Recognition (ICPR). IEEE, 2018. (Year: 2018).*
Cheon, Manri, et al. "Generative adversarial network-based image super-resolution using perceptual content losses." arXiv preprint arXiv:1809.04783v2 (2018). (Year: 2018).*
Mechrez, Roey, Itamar Talmi, and Lihi Zelnik-Manor. "The Contextual Loss for Image Transformation with Non-Aligned Data." arXiv preprint arXiv:1803.02077v4 (2018). (Year: 2018).*
Zhang, Dongyang, et al. "Sharp and real image super-resolution using generative adversarial network." International Conference on Neural Information Processing. Springer, Cham, 2017. (Year: 2017).*
The First Office Action dated Jul. 2, 2020 corresponding to Chinese application No. 201810280478.2.
The First Office Action dated Feb. 11, 2020 corresponding to Chinese application No. 201811155930.9.
The First Office Action dated Apr. 27, 2020 corresponding to Chinese application No. 201811155147.2.
The First Office Action dated Jun. 30, 2020 corresponding to Chinese application No. 201811155252.6.
The First Office Action dated Apr. 26, 2020 corresponding to Chinese application No. 201811155326.6.
International Search Report dated Mar. 15, 2019 corresponding to application No. PCT/CN2018/121466.
Salimans, et al. "Improved Techniques for Training GANs"; Jun. 10, 2016.
Goodfellow, et al. "Deep learning. MIT Press—Chapter 9 Convolutional Networks"; 2016.
Lai, et al. "Fast and Accurate Image Super-Resolution with Deep Laplacian Pyramid Networks"; Aug. 9, 2018.

(56) References Cited

OTHER PUBLICATIONS

Huang, et al. "Densely Connected Convolutional Networks"; Jan. 28, 2018.
He, et al. "Deep Residual Learning for Image Recognition"; Dec. 10, 2015.
Yang, et al. "Convolutional Neural Networks with Alternately Updated Clique"; Apr. 3, 2018.
Wang, et al. "High-Resolution Image Synthesis and Semantic Manipulation with Conditional GAMS"; Aug. 20, 2018.
Michelini, et al. "Multi-Scale Recursive and Perception-Distortion Controllable Image Super-Resolution"; 2018.
He, et al. "Deep Residual Learning for Image Recognition"; 2016.
Liu, et al. "Deep Networks for Image-to-Image Translation with Mux and Demux Layers"; 2018.
Bulat, et al. "To Learn Image Super-Resolution, Use A GAN to Learn How to do Image Degradation First"; Jul. 30, 2018.
Notification of a Grant dated Jan. 18, 2022 corresponding to Korean application No. 9-5-2022-005086425.
Indian First Office Action dated Dec. 27, 2021 corresponding to application No. 202027055323.
United States of America Non-Final Office Action dated Nov. 15, 2021 corresponding to U.S. Appl. No. 16/614,547.
Notice of Allowance dated Jul. 27, 2021 issued in corresponding U.S. Appl. No. 16/465,294.
Office Action dated Apr. 23, 2021 issued in corresponding U.S. Appl. No. 16/465,294.
Office Action dated Sep. 9, 2021 issued in corresponding U.S. Appl. No. 16/614,558.
Notice of Acceptance dated Sep. 28, 2021 issued in corresponding Australian Application No. 2019350918.
Office Action dated May 21, 2021 issued in corresponding Australian Application No. 2019350918.
Office Action dated May 13, 2021 issued in corresponding Russian Application No. 2020136214.
Search Report dated Jul. 24, 2019 issued in corresponding International Application No. PCT/CN2019/083872.
Search Report dated Sep. 27, 2019 issued in corresponding International Application No. PCT/CN2019/092042.
Search Report dated Sep. 26, 2019 issued in corresponding International Application No. PCT/CN2019/092113.
Search Report dated Dec. 26, 2019 issued in corresponding International Application No. PCT/CN2019/107761.
Yu, et al., "Ultra-Resolving Face Images by Discriminative Generative Networks", ECCV-16 submission ID 1002, pp. 1-16.
Samangouei, et al., "Defense-GAN: Protecting Classifiers Against Adversarial Attacks Using Generative Models", Published as a conference paper at ICLR 2018, pp. 1-17.
First Office Action dated Oct. 29, 2021 for application No. KR 10-2020-7014462 with English translation attached.
First Office Action dated Nov. 8, 2021 for application No. IN 202047021736.
Extended European Search Report dated Dec. 17, 2021 for application No. EP 18889945.4.
Liu, Hanwen; Michelini, Pablo Navarrete; Zhu, Dan: Deep Networks for Image-to-Image Translation with Mux and Demux Layers: ECCV 2018 workshop paper: Beijing, China.
He, Kaiming; Zhang, Xiangyu; Ren, Shaoqing; Sun, Jian: Deep Residual Learning for Image Recognition: Microsoft Research: Dec. 10, 2015.
Lim, Bee; Son, Sanghyun; Kim, Heewon; Nah, Seungjun; Lee, Kyoung Mu: Enhanced Deep Residual Networks for Single Image Super-Resolution: Jul. 10, 2017: Seoul, Korea.
Lai, Wei-Sheng; Huang, Jia-Bin; Ahuja, Narendra; Yang, Ming-Hsuan: Fast and Accurate Image Super-Resolution with Deep Laplacian Pyramid Networks: Aug. 9, 2018.
Rasti, Pejman; Demirel, Hasan; Anbarjafari, Gholamreza: Iterative Back Projection based Image Resolution Enhancement: 2013 8th Iranian Conference of Machine Vision and Image Processing: Zanjan, Iran.
Huang, Gao; Chen, Danlu; Li, Tianhong; Wu, Felix; Van Der Maaten, Laurens; Weinberger, Kilian: Multi-Scale Dense Networks for Resource Efficient Image Classification: Published as a conference paper at ICLR 2018: Jun. 7, 2018.
Michelini, Pablo Navarrete; Zhu, Dan; Liu, Hanwen: Multi-Scale Recursive and Perception-Distortion Controllable Image Super-Resolution: ECCV 2018 workshop paper: Jan. 29, 2019.
Takeki, et al. "Parallel Grid Pooling for Data Augmentation"; Mar. 30, 2018.
Ruderman, Daniel L. "The Statistics of Natural Images"; Computation in Neural Systems 5 (1994), 517-548.
The Extended European Search Report dated May 31, 2022 corresponding to application No. 19850782.4-1210.
"Translate an Image Using Imtranslate Function"; MATLAB & Simulink; The Wayback Machine; Jul. 6, 2022.
Blau, Yochai, et al. "The Perception-DistortionTradeoff"; IEEE; Oct. 25, 2020.
"Rgb2gray"; MATLAB; The Wayback Machine; Jul. 7, 2022.
Ledig, Christian, et al. "Photo-Realistic Single Image Super-Resolution Using a Generative Adversarial Network"; Twitter, Inc.; Sep. 15, 2016.
Navarrete, Pablo, et al. "Multi-Scale Recursive and Perception-Distortion Image Super Resolution"; BOE Technology Group Co., Ltd.; Sep. 27, 2018.
"ImTranslate"; The Wayback Machine; MATLAB; Jul. 7, 2022
Liu, Hanwen, et al. "Deep Networks for Image-to-Image Translation with Mux and Demux Layers"; BOE Technology Group Co., Ltd.; Springer Nature Switzerland; 2019.
"Circshift"; The Wayback Machine; MATLAB; Jul. 7, 2022.
Mittal, Anish, et al. "No-Reference Image Quality Assessment in the Spatial Domain"; IEEE Transactions on Image Processing ; vol. 21, No. 12; Dec. 2012.
Khan, Amir, et al. "Implementation and Experiments on Face Detection System (FDS) Using Perceptual Quality Aware Features"; Eastern Mediterranean University; Feb. 2017.
United States of America Non-Final Office Action dated Jul. 13, 2022 corresponding to U.S. Appl. No. 16/604,410.
The Extended European Search Report dated Jun. 17, 2022 corresponding to application No. 19850757.6-1207.
The Extended European Search Report dated Jul. 8, 2022 corresponding to application No. 19850805.3-1210.
The Extended European Search Report dated Jul. 13, 2022 corresponding to application No. 19864756.2-1210.

\* cited by examiner

TRAINING METHOD FOR GENERATIVE ADVERSARIAL NETWORK, IMAGE PROCESSING METHOD, DEVICE AND STORAGE MEDIUM

CROSS REFERENCE TO RELATED APPLICATIONS

This is a National Phase Application filed under 35 U.S.C. 371 as a national stage of PCT/CN2019/107761, filed Sep. 25, 2019, an application claiming the benefit of Chinese Application No. 201811155930.9, filed Sep. 30, 2018, Chinese Application No. 201811155326.6, filed Sep. 30, 2018, Chinese Application No. 201811155147.2, filed Sep. 30, 2018 and Chinese Application No. 201811155252.6, filed Sep. 30, 2018 the content of each of which is hereby incorporated by reference in its entirety.

TECHNICAL FIELD

The present disclosure relates to, but is not limited to, the field of image processing, and in particular, to a training method for generative adversarial network, an image processing method using a generative adversarial network obtained by the training method, a computer device, and a computer-readable storage medium.

BACKGROUND

A convolutional neural network is a common deep learning network, and has been widely applied to the field of image processing nowadays to achieve image identification, image classification, super-resolution image reconstruction, and so on.

With current methods of super-resolution reconstruction, a second-resolution image reconstructed based on a first-resolution image (a resolution of the second-resolution image is higher than that of the first-resolution image) usually lacks detail information, which makes the second-resolution image look unreal.

SUMMARY

The present disclosure provides a training method for generative adversarial network, the generative adversarial network includes a generative network and a discriminative network, the generative network is configured to convert a first-resolution image into a second-resolution image, with a resolution of the second-resolution image higher than that of the first-resolution image, and the training method includes a generative network training procedure, which includes:

extracting a first-resolution sample image from a second-resolution sample image, with a resolution of the second-resolution sample image higher than that of the first-resolution sample image;

separately providing a first input image and a second input image for the generative network to generate a first output image based on the first input image, and a second output image based on the second input image respectively; the first input image includes the first-resolution sample image and a first noise image corresponding to a noise sample with a first amplitude, and the second input image includes the first-resolution sample image and a second noise image corresponding to a noise sample with a second amplitude; and the first amplitude is greater than 0, and the second amplitude is equal to 0;

separately providing the first output image and the second-resolution sample image for the discriminative network to allow the discriminative network to output a first discrimination result based on the first output image, and a second discrimination result based on the second-resolution sample image; and adjusting parameters of the generative network to reduce a loss function of the generative network; the loss function of the generative network includes a first loss, a second loss and a third loss, the first loss of the loss function is based on a reconstruction error between the second output image and the second-resolution sample image; the second loss of the loss function is based on a perceptual error between the first output image and the second-resolution sample image; and the third loss of the loss function is based on the first discrimination result and the second discrimination result.

In some implementations, the reconstruction error between the second output image and the second-resolution sample image is determined according to any one of L1 norm of a difference image matrix between the second output image and the second-resolution sample image, a mean square error between the second output image and the second-resolution sample image, and a structural similarity index between the second output image and the second-resolution sample image.

In some implementations, both the first output image and the second output image are generated by the generative network through an iteration process of a resolution enhancement procedure; and the first loss of the loss function of the generative network is $\lambda_1 L_{rec}(X, Y_{n=0})$, and $$L_{rec}(X, Y_{n=0}) = E\left[\sum_{l=1}^{L} \|Y_{n=0}^l - HR^l\|_1\right] + E\left[\sum_{l=1}^{L} \|D_{bic}^l(Y_{n=0}^l) - LR\|_1\right]$$

where, X denotes the second-resolution sample image;
$Y_{n=0}$ denotes the second output image;
$L_{rec}(X, Y_{n=0})$ denotes the reconstruction error between the second output image and the second-resolution sample image;
L denotes a total number of times of the resolution enhancement procedure in the iteration process; and $L \geq 1$
$Y_{n=0}^l$ denotes an image generated at the end of the $l^{th}$ time of the resolution enhancement procedure in an iteration process performed by the generative network based on the second input image; and $1 \leq l \leq L$;
LR denotes the first-resolution sample image;
$D_{bic}^l(Y_{n=0}^l)$ denotes an image obtained by downsampling $Y_{n=0}^l$, a resolution of the image being the same as that of the first-resolution sample image;
$HR^l$ denotes an image obtained by downsampling the second-resolution sample image, a resolution of the image being the same as that of $Y_{n=0}^l$;
E[ ] denotes calculation of matrix energy; and
$\lambda_1$ is a preset weight.

In some implementations, the second loss of the loss function of the generative network is $\lambda_2 L_{per}(X, Y_{n=1})$, and $$L_{per}(X, Y_{n=1}) = E\left[\sum_{l=1}^{L} L_{CX}(Y_{n=1}^l, HR^l)\right] + E\left[\sum_{l=1}^{L} L_{CX}(D_{bic}^l(Y_{n=1}^l), LR)\right]$$

where, $Y_{n=1}$ denotes the first output image;

$L_{per}(X, Y_{n=1})$ denotes the perceptual error between the first output image and the second-resolution sample image;

$Y_{n=1}^{l}$ denotes an image generated at the end of the $l^{th}$ time of the resolution enhancement procedure in an iteration process performed by the generative network based on the first input image;

$D_{bic}^{l}(Y_{n=1}^{l})$ denotes an image obtained by downsampling $Y_{n=1}^{l}$, a resolution of the image being the same as that of the first-resolution sample image;

$L_{CX}(\ )$ is a contextual loss calculation function; and $\lambda_2$ is a preset weight.

In some implementations, the third loss of the loss function of the generative network is $\lambda_3 L_{GAN}(Y_{n=1})$, and $$L_{GAN}(Y_{n=1})=E[\log(1-D(Y_{n=1}^{1,2,\cdots L}))]+E[\log(D(HR^{1,2,\cdots L}))]$$

where, $Y_{n=1}^{1,2\cdots L}$ denotes an image group generated in the iteration process performed by the generative network based on the first input image, the image group including images each generated at the end of each time of the resolution enhancement procedure;

$HR^{1,2,\cdots L}$ denotes images obtained by downsampling the second-resolution sample image, the images being in one-to-one correspondence with the images in $Y_{n=1}^{1,2,\cdots L}$, and each having a resolution the same as that of the corresponding image;

$D(Y_{n=1}^{1,2,\cdots L})$ denotes the first discrimination result;

$D(HR^{1,2,\cdots L}$ denotes the second discrimination result; and $\lambda_3$ is a preset weight.

In some implementations, $\lambda_1:\lambda_2:\lambda_3=10:0.1:0.001$

In some implementations, the noise sample is random noise. In some implementations, the training method further includes a discriminative network training procedure, which includes: separately providing the first output image and the second-resolution sample image for the discriminative network to allow the discriminative network to output a discrimination result based on the first output image and a discrimination result based on the second-resolution sample image, respectively; and adjusting parameters of the discriminative network to reduce a loss function of the discriminative network;

the discriminative network training procedure and the generative network training procedure are alternately performed until a preset training condition is met.

In some implementations, both the first output image and the second output image are generated by the generative network through an iteration process of the resolution enhancement procedure, and a total number of times of the resolution enhancement procedure in the iteration process is L; and when L is greater than 1, in the previous L−1 times of the resolution enhancement procedure in the iteration process performed by the generative network based on the first input image, the generative network generates an intermediate image each time the resolution enhancement procedure is performed;

in the discriminative network training procedure, each intermediate image generated by the generative network based on the first input image is provided for the discriminative network, while the first output image is being provided for the discriminative network; and while the second-resolution sample image is being provided for the discriminative network, and third-resolution sample images obtained by downsampling the second-resolution sample image are provided for the discriminative network, the third-resolution sample images being in one-to-one correspondence with intermediate images, and each having a resolution the same as that of the corresponding intermediate image Accordingly, the present disclosure further provides an image processing method using the generative network of the generative adversarial network obtained by the training method, and the image processing method is used for increasing a resolution of an image, and includes:

providing an input image and a noise image corresponding to reference noise for the generative network to allow the generative network to generate a second-resolution image based on the input image.

In some implementations, an amplitude of the reference noise ranges from 0 to the first amplitude.

In some implementations, the reference noise is random noise.

Accordingly, the present disclosure further provides a computer device including a memory having computer programs stored thereon, and a processor, and the above training method is performed when the computer programs are executed by the processor.

Accordingly, the present disclosure further provides a computer-readable storage medium having computer programs stored thereon, and the above training method is performed when the computer programs are executed by a processor.

BRIEF DESCRIPTION OF THE DRAWINGS

The accompanying drawings are intended to provide a further understanding of the present disclosure, and are incorporated in and constitute a part of the specification. The drawings, together with the specific embodiments below, are intended to explain the present disclosure, but do not make any limitation to the present disclosure. In the drawings.

DETAILED DESCRIPTION

The specific embodiments of the present disclosure are described in detail below with reference to the accompanying drawings. It should be understood that the specific embodiments described herein are merely for illustrating and explaining the present disclosure, but do not make any limitation to the present disclosure.

Figure 1:
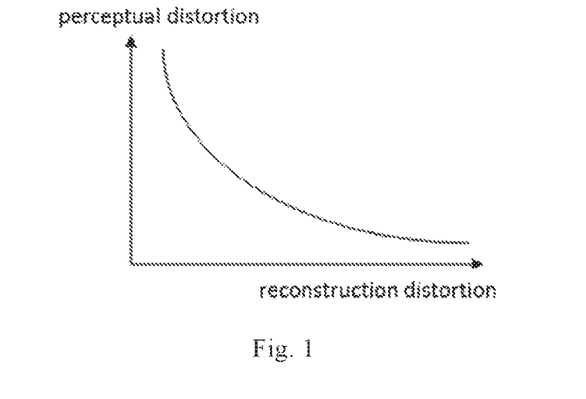
FIG. 1 is a schematic diagram illustrating a relationship between reconstruction distortion and perceptual distortion.

Super-resolution image reconstruction is a technology for increasing a resolution of an initial image to obtain an image with a higher resolution. In the super-resolution image reconstruction, reconstruction distortion and perceptual distortion are used for evaluating a super-resolution reconstruction effect. The reconstruction distortion is used for measuring a difference between a reconstructed image and a reference image, and specific evaluation criteria include mean square error (MSE), structural similarity index (SSIM), and peak signal-to-noise ratio (PSNR); and the perceptual distortion mainly focuses on making the image more look like a natural image. FIG. 1 is a schematic diagram illustrating a relationship between the reconstruction distortion and the perceptual distortion. As shown in FIG. 1, when the reconstruction distortion is relatively small, the perceptual distortion is relatively large, in which case the reconstructed image looks smoother but lacks details. When the perceptual distortion is relatively small, the reconstruction distortion is relatively large, in which case the reconstructed image has more details. The current super-resolution image reconstruction methods usually aim at relatively small reconstruction distortion, but people prefer to obtaining reconstructed images with rich details in some application scenarios.

The present disclosure provides a training method for generative adversarial network, the generative adversarial network includes a generative network and a discriminative network, the generative network is configured to convert a first-resolution image into a second-resolution image to obtain the second-resolution image having a target resolution, and the resolution of the second-resolution image is higher than that of the first-resolution image. The generative network can obtain the second-resolution image by performing a resolution enhancement procedure once or iterating a resolution enhancement procedure for a plurality of times. For example, an image to be processed (i.e., a first-resolution image) has a resolution of 128×128 and the target resolution is 1024×1024, the generative network may obtain the second-resolution image having a resolution of 1024×1024 by performing once the resolution enhancement procedure which increases a resolution by 8 times; or the generative network may obtain a 256×256 image, a 512×512 image and a 1024×1024 image in sequence by iterating the resolution enhancement procedure, which increases a resolution by 2 times, three times.

Figure 2:
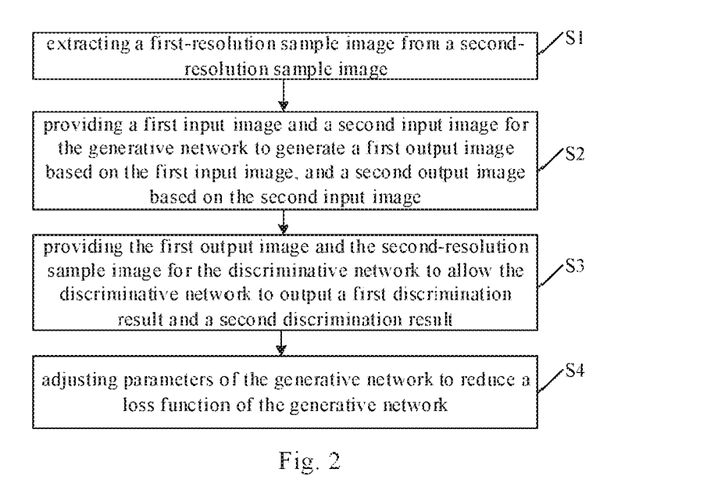
FIG. 2 is a flowchart illustrating a generative network training procedure according to the embodiments of the present disclosure.

The training method for generative adversarial network includes a generative network training procedure. FIG. 2 is a flowchart illustrating the generative network training procedure according to the embodiments of the present disclosure. As shown in FIG. 2, the generative network training procedure includes following S1 through S4.

S1, extracting a first-resolution sample image from a second-resolution sample image, with a resolution of the second-resolution sample image higher than that of the first-resolution sample image. Specifically, the first-resolution sample image may be obtained by downsampling the second-resolution sample image.

S2, separately providing a first input image and a second input image for the generative network to generate a first output image based on the first input image, and a second output image based on the second input image respectively, with the first input image including the first-resolution sample image and a first noise image corresponding to a noise sample with a first amplitude, and the second input image including the first-resolution sample image and a second noise image corresponding to a noise sample with a second amplitude. The first amplitude is greater than 0, and the second amplitude is equal to 0.

The amplitude of the noise sample is an average fluctuation amplitude of the noise sample. For example, the noise sample is random noise, a mean of an image corresponding to the noise sample is $\mu$, and a variance of the image corresponding to the noise sample is $\sigma$, that is, most pixel values of the image corresponding to the noise sample fluctuate from $\mu-\sigma$ to $\mu+\sigma$, in which case a noise amplitude is $\mu$. It should be understood that any image is shown in the form of matrix in an image processing process, and the pixel values represent element values of an image matrix. When the amplitude of the noise sample is 0, since no element value of the image matrix is less than 0, each element value of the image matrix may be considered to be 0.

In addition, it should be noted that the training method for generative adversarial network includes a plurality of generative network training procedures; and in a single generative network training procedure, the first-resolution sample image is the single one, and model parameters of the generative network when receiving the first input image and the second input image are the same.

S3, separately providing the first output image and the second-resolution sample image for the discriminative network to allow the discriminative network to output a first discrimination result based on the first output image, and a second discrimination result based on the second-resolution sample image. The first discrimination result is used for representing a matching degree between the first output image and the second-resolution sample image, for example, the first discrimination result is used for representing a probability determined by the discriminative network that the first output image is identical to the second-resolution sample image; and the second discrimination result is used for representing a probability determined by the discriminative network that the second-resolution sample image is indeed the second-resolution sample image.

The discriminative network may be regarded as a classifier having a scoring function. The discriminative network can score a received to-be-discriminated image, and output a score which indicates a probability that the to-be-discriminated image (the first output image) is identical to the second-resolution sample image, that is, indicating the matching degree mentioned above, which may range from 0 to 1. When the output score of the discriminative network is 0 or close to 0, it is indicated that the discriminative network classifies the received to-be-discriminated image as a non-high-resolution sample image; and when the output score of the discriminative network is 1 or close to 1, it is indicated that the received to-be-discriminated image is identical to the second-resolution sample image.

The scoring function of the discriminative network may be trained by use of a "true" sample and a "false" sample with predetermined scores. For example, the "false" sample is an image generated by the generative network and the "true" sample is the second-resolution sample image. A training process of the discriminative network is a process of adjusting parameters of the discriminative network to enable the discriminative network to output a score close to 1 when receiving the "true" sample, and output a score close to 0 when receiving the "false" sample.

S4, adjusting parameters of the generative network to reduce a loss function of the generative network. "To reduce a loss function of the generative network" means that a value of the loss function is reduced as compared to that in previous generative network training procedure, or that values of the loss function in a plurality of generative network training procedures show decreasing trend. The loss function of the generative network includes a first loss, a second loss, and a third loss; specifically, the loss function is superposition of the first loss, the second loss and the third loss, and the first loss is based on a reconstruction error between the second output image and the second-resolution sample image; the second loss is based on a perceptual error between the first output image and the second-resolution sample image; and the third loss is based on the first discrimination result and the second discrimination result.

In super-resolution reconstruction, detail features (e.g. hairs, lines, etc.) in a reconstructed second-resolution image are usually related to noise. When no noise is added in the training of the generative network, the second-resolution image generated by the generative network has small reconstruction distortion and large perceptual distortion, so that the second-resolution image looks unreal by the naked eye; when noise is added in the training of the generative network, the reconstructed second-resolution image has obvious detail features, but the reconstruction distortion thereof is relatively large. In the generative network training procedure of the present disclosure, the second input image including a noise image with an amplitude of 0 and the first input image including a noise image with an amplitude of 1 are separately provided for the generative network for training, and the first loss of the loss function reflects the reconstruction distortion of a result generated by the generative network, and the second loss reflects the perceptual distortion of the result generated by the generative network, that is, the loss function combines two distortion evaluation criteria. When a trained generative network is used to perform resolution enhancement on an image, an amplitude of input noise can be adjusted according to actual needs (i.e., whether details of the image need to be emphasized and to what extent the details are emphasized), so that a reconstructed image can meet the actual needs. For example, within a given range of reconstruction distortion, minimum perceptual distortion is achieved by adjusting the amplitude of the input noise; or within a given range of perceptual distortion, minimum reconstruction distortion is achieved by adjusting the amplitude of the input noise.

It should be noted that the amplitude of the noise image of the first input image, which is 1 in the embodiment, is an amplitude value obtained by normalizing the amplitude of the noise image. In other embodiments of the present disclosure, it is possible not to normalize the amplitude of the noise image, so that the amplitude of the noise image of the first input image may be not equal to 1.

In some implementations, the noise sample is random noise; and a mean of the first noise image is 1. In some implementations, a mean of the first noise image is a mean of a normalized image of the first noise image. For example, if the first noise image is a grayscale image, an average of all pixel values in an image obtained by normalizing the first noise image is the mean of the first noise image; as another example, if the first noise image is a color image, an average of all pixel values in an image obtained by normalizing every channel of the first noise image is the mean of the first noise image. It should be noted that the channel of the image in the embodiment of the present disclosure indicates one or more channels obtained by dividing an image for processing, for example, an RGB-mode color image may be divided into three channels, i.e., a red channel, a green channel, and a blue channel; if the image is a grayscale image, it is a one-channel image; and if the color image is divided according to an HSV color system, the image may be divided into three channels, i.e., a hue (H) channel, a saturation (S) channel, and a value (V) channel.

In some implementations, the loss function of the generative network is represented in a formula as follows:

$$\text{Loss} = \lambda_1 L_{rec}(X, Y_{n=0}) + \lambda_2 L_{per}(X, Y_{n=1}) + \lambda_3 L_{GAN}(Y_{n=1})$$

where, in the first loss $\lambda_1 L_{rec}(X, Y_{n=0})$ of the loss function Loss, $L_{rec}(X, Y_{n=0})$ denotes the reconstruction error between the second output image and the second-resolution sample image; in the second loss $\lambda_2 L_{per}(X, Y_{n=1})$ of the loss function Loss, $L_{per}(X, Y_{n=1})$ denotes the perceptual error between the second output image and the second-resolution sample image; in the third loss $\lambda_3 L_{GAN}(Y_{n=1})$ of the loss function Loss, $L_{GAN}(Y_{n=1})$ denotes a sum of the first discrimination result and the second discrimination result; and $\lambda_1, \lambda_2, \lambda_3$ are all preset weights. $\lambda_1: \lambda_2: \lambda_3$ may be adjusted according to actual needs, for example, $\lambda_1: \lambda_2: \lambda_3 = 10:0.1:0.001$, or $\lambda_1: \lambda_2: \lambda_3 = 1:1:0.5$. In some embodiments, $\lambda_1: \lambda_2: \lambda_3$ may be set according to continuity of local images. While in some other embodiments, $\lambda_1: \lambda_2: \lambda_3$ may be set according to target pixels of an image.

Specifically, the reconstruction error $L_{rec}(X, Y_{n=0})$ between the second output image $Y_{n=0}$ and the second-resolution sample image X is calculated according to the following formula:

$$L_{rec}(X, Y_{n=0}) = E\left[\sum_{l=1}^{L} \|Y_{n=0}^l - HR^l\|_1\right] + E\left[\sum_{l=1}^{L} \|D_{bic}^l(Y_{n=0}^l) - LR\|_1\right]$$

where both the first output image and the second output image are generated by the generative network through an iteration process of a resolution enhancement procedure; and a total number of times of the resolution enhancement procedure in the iteration process is L, and $L \geq 1$.

$Y_{n=0}^l$ denotes an image generated at the end of the $l^{th}$ time of the resolution enhancement procedure in an iteration process performed by the generative network based on the second input image; and $l \leq L$. It should be understood that the generative network generates the second output image $Y_{n=0}$ when $l=L$.

LR denotes the first-resolution sample image; and $D_{bic}^l(Y_{n=0}^l)$ denotes an image obtained by downsampling $Y_{n=0}^l$, a resolution of the image being the same as that of the first-resolution sample image. The downsampling may be performed in a way the same as that for extracting the first-resolution sample image from the second-resolution sample image in the step S1.

$HR^l$ denotes an image obtained by downsampling the second-resolution sample image, a resolution of the image being the same as that of $Y_{n=0}^l$. It should be noted that, when $l=L$, $Y_{n=0}^l$ is the second output image $Y_{n=0}$, and $HR^l$ is the second-resolution sample image itself, or may be considered as an image obtained by downsampling the second-resolution sample image by 1 time.

E[ ] denotes calculation of matrix energy. For example, E[ ] can calculate a maximum or average of the elements in a matrix in "[ ]".

In the case of iterating a resolution enhancement procedure by the generative network for a plurality of times, when calculating the reconstruction error, L1 norm of a difference image matrix between the second output image itself and the second-resolution sample image is calculated, L1 norm of a difference image matrix between a third-resolution image (i.e., $Y_{n=0}^1, Y_{n=0}^2, \ldots Y_{n=0}^{L-1}$) generated by the generative network and a third-resolution sample image (i.e., $HR^1, HR^2, \ldots, HR^{L-1}$) is also calculated, a resolution of the third-resolution sample image being the same as that of the third-resolution image. At the same time, L1 norm of a difference image between the third-resolution image, the image generated by downsampling the second output image, and the first-resolution sample image is also calculated. In this way, when the generative network is used for resolution enhancement and noise with an amplitude of 0 is input, an image finally output by the generative network can achieve minimum reconstruction distortion. It should be noted that the resolution of the third-resolution image is higher than that of the first-resolution sample image, and is the same as that of the third-resolution sample image.

In the above embodiment, the reconstruction error $L_{rec}(X, Y_{n=0})$ between the second output image and the second-resolution sample image is obtained based on the L1 norm of the difference image matrix between the second output image and the second-resolution sample image, or the reconstruction error may be obtained based on a mean square error (MSE) between the second output image and the second-resolution sample image, or may be obtained based on a structural similarity index (SSIM) between the second output image and the second-resolution sample image.

In some implementations, the perceptual error $L_{per}(X, Y_{n=1})$ between the first output image $Y_{n=1}$ and the second-resolution sample image X is calculated according to the following formula:

$$L_{per}(X, Y_{n=1}) = E\left[\sum_{l=1}^{L} L_{CX}(Y_{n=1}^{l}, HR^{l})\right] + E\left[\sum_{l=1}^{L} L_{CX}(D_{bic}^{l}(Y_{n=1}^{l}), LR)\right]$$

$Y_{n=1}^{l}$ denotes an image generated at the end of the $l^{th}$ time of the resolution enhancement procedure in an iteration process performed by the generative network based on the first input image; and $l \leq L$. It should be understood that the generative network generates the first output image $Y_{n=1}$ when $l=L$.

$D_{bic}^{l}(Y_{n=1}^{l})$ denotes an image obtained by downsampling $Y_{n=1}^{l}$, a resolution of the image being the same as that of the first-resolution sample image LR. The downsampling may be performed in a way the same as that for extracting the first-resolution sample image from the second-resolution sample image in the step S1. Reference may be made to the above description for the meanings of $HR^{l}$ and E[ ], which will not be repeated herein.

$L_{CX}(\ )$ denotes a contextual loss calculation function.

Similar to the calculation of the reconstruction error, calculation of the perceptual error not only involves calculation of a different between the first output image and the second-resolution sample image by use of the contextual loss calculation function, but also involves calculation of a difference between a third-resolution image (i.e., $Y_{n=1}^{1}$、$Y_{n=1}^{2}$、 . . . $Y_{n=1}^{L-1}$ generated by the generative network based on the first input image and a third-resolution sample image (i.e., $HR^{1}$、$HR^{2}$、 . . . $HR^{L-1}$), a resolution of the third-resolution sample image being the same as that of the third-resolution image, and further involves calculation of a difference between the third-resolution image, the image generated by downsampling the second output image, and the first-resolution sample image. In this way, when the generative network is used for resolution enhancement and noise with the first amplitude is input, an image finally output by the generative network can achieve minimum perceptual distortion.

In some implementations, $L_{GAN}(Y_{n=1})$ in the third loss of the loss function of the generative network is calculated according to the following formula:

$$L_{GAN}(Y_{n=1}) = E[\log(1-D(Y_{n=1}^{1, 2, \cdots L}))]E[\log(D(HR^{1, 2, \cdots L}))]$$

where, $Y_{n=1}^{1, 2, \cdots L}$ denotes an image group generated in an iteration process performed by the generative network based on the first input image, the image group including images each generated at the end of each time of the resolution enhancement procedure. When L=1, the image group includes the first output image alone; and when L>1, the image group includes $Y_{n=1}^{1}$ to $Y_{n=1}^{L-1}$, and the first output image $Y_{n=1}$.

$HR^{1, 2, \cdots L}$ denotes images obtained by downsampling the second-resolution sample image, the images being in one-to-one correspondence with the images in $Y_{n=1}^{1, 2, \cdots L}$ and each having a resolution the same as that of the corresponding image. $HR^{L}$ is the second-resolution sample image itself.

$D(Y_{n=1}^{1, 2, \cdots L})$ denotes a discrimination result generated by the discriminative network based on $Y_{n=1}^{1, 2, \cdots L}$, that is, the first discrimination result; and $D(HR^{1, 2, \cdots L})$ denotes a discrimination result generated by the discriminative network based on $HR^{1, 2, \cdots L}$ that is, the second discrimination result.

In the training method of the present disclosure, in addition to the generative network training procedure, the training method further includes a discriminative network training procedure, which includes: separately providing the first output image and the second-resolution sample image for the discriminative network to allow the discriminative network to output a discrimination result based on the first output image and a discrimination result based on the second-resolution sample image, respectively; and adjusting the parameters of the discriminative network to reduce a loss function of the discriminative network.

The discriminative network training procedure and the generative network training procedure are alternately performed until a preset training condition is met. For example, the preset training condition may be that the number of alternation times reaches a predetermined value.

In an initialization process, the parameters of the generative network and the discriminative network are preset or random.

As described above, both the first output image and the second output image are generated by the generative network through an iteration process of the resolution enhancement procedure, and a total number of times of the resolution enhancement procedure in the iteration process is L. When L=1, it is possible to supply the first output image or the second-resolution sample image alone to the discriminative network each time an image is supplied to the discriminative network. When L>1, in the previous L−1 times of the resolution enhancement procedure performed by the generative network based on the first input image, the generative network generates an intermediate image each time the resolution enhancement procedure is performed; and when the resolution enhancement procedure is iterated for the $L^{th}$ time, the image generated by the generative network is the first output image. In such case, the discriminative network is provided with a plurality of input terminals to receive a plurality of images simultaneously, and determines a matching degree between one of the received plurality of images, which has a highest resolution, and the second-resolution sample image. In the discriminative network training procedure, each intermediate image generated by the generative network based on the first input image is provided for the discriminative network, while the first output image is being provided for the discriminative network; and while the second-resolution sample image is being provided for the discriminative network, third-resolution sample images obtained by downsampling the second-resolution sample image are provided for the discriminative network, the third-resolution sample images being in one-to-one correspondence with intermediate images, and each having a resolution the same as that of the corresponding intermediate image.

In the training process of the generative network, the parameters of the generative network are adjusted to enable the discriminative network to output a matching degree as close to 1 as possible as a discrimination result after an output result of the generative network is input into the discriminative network, that is, to enable the discriminative network to regard the output result of the generative network as the second-resolution sample image. In the training process of the discriminative network, the parameters of the discriminative network are adjusted to enable the discriminative network to output a matching degree as close to 1 as possible after the second-resolution sample image is input into the discriminative network, and also enable the discriminative network to output a matching degree as close to 0 as possible after an output result of the generative network is input into the discriminative network; that is, the discriminative network can be trained to be capable of determining whether a received image is the second-resolution sample image. By alternately training the generative network and the discriminative network, the discriminative network is continuously optimized to improve discrimination capability, and the generative network is continuously optimized to output a result as close to the second-resolution sample image as possible. With this method, the two "opposing" models compete with each other and each is improved based on an increasingly better result from the other one in each training process, so that the generative adversarial network model obtained are getting better and better.

The present disclosure further provides an image processing method using a generative adversarial network obtained by the above training method, and the image processing method is used for increasing a resolution of an image by using a generative network of the generative adversarial network, and includes providing an input image and a noise image corresponding to reference noise for the generative network to allow the generative network to generate an image having a higher resolution than the input image. An amplitude of the reference noise ranges from 0 to a first amplitude. Specifically, the reference noise is random noise.

In the training process of the generative network of the generative adversarial network according to the present disclosure, the noise sample with an amplitude of 0 and the noise sample with a first amplitude are separately provided for the generative network, and the loss function of the generative network combines two distortion evaluation criteria for evaluating the reconstruction distortion and the perceptual distortion, so that the amplitude of reference noise can be adjusted according to the actual needs when the generative network is used to increase a resolution of an image, so as to meet the actual needs. For example, within a given range of reconstruction distortion, minimum perceptual distortion is achieved by adjusting the amplitude of the reference noise; or within a given range of perceptual distortion, minimum reconstruction distortion is achieved by adjusting the amplitude of the reference noise.

Figure 3:
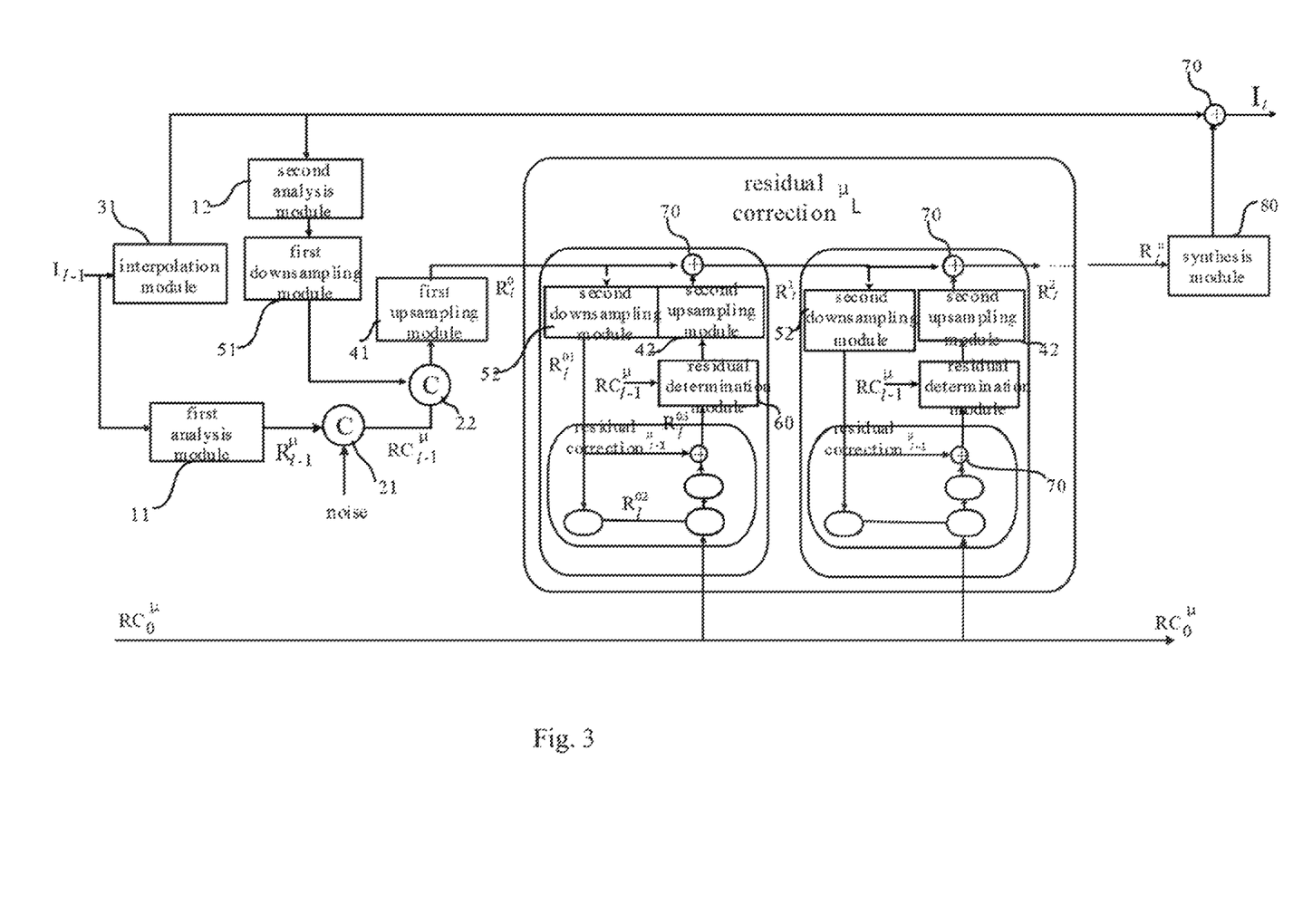
FIG. 3 is a schematic structural diagram of a generative network according to the embodiments of the present disclosure.

FIG. 3 is a schematic structural diagram of a generative network according to the embodiments of the present disclosure. The generative network is described below in conjunction with FIG. 3. The generative network is used for iterating a resolution enhancement procedure, and a resolution of a to-be-processed image $I_{l-1}$ is increased each time the resolution enhancement procedure is performed, so as to obtain an image $I_l$ with an increased resolution. When a total number of times of the iteration of the resolution enhancement procedure is 1, the to-be-processed image $I_{l-1}$ is an initial input image; when the total number of times of the iteration of the resolution enhancement procedure is L and L>1, the to-be-processed image $I_{l-1}$ is an image output after iterating the resolution enhancement procedure for the $(l-1)^{th}$ time. The generative network is illustrated below by an example as follows: the initial input image has a resolution of 128×128, the resolution is increased by 2 times in each resolution enhancement procedure, and l=2. In this example, the to-be-processed image $I_{l-1}$ in FIG. 3 is a 256×256 image obtained after performing the resolution enhancement procedure once.

As shown in FIG. 3, the generative network includes a first analysis module 11, a second analysis module 12, a first concatenating module 21, a second concatenating module 22, an interpolation module 31, a first upsampling module 41, a first downsampling module 51, a superposition module 70, and a residual correction system for iteration.

The first analysis module 11 is configured to generate a feature image $R_{l-1}^{\mu}$ of the to-be-processed image $I_{l-1}$, and a number of channels of the feature image $R_{l-1}^{\mu}$ is greater than that of the to-be-processed image $I_{l-1}$.

The first concatenating module 21 is configured to concatenate the feature image $R_{l-1}^{\mu}$ of the to-be-processed image and a noise image to obtain a first merged image $RC_{l-1}^{\mu}$; and a number of channels of the first merged image $RC_{l-1}^{\mu}$ is a sum of the number of the channels of the feature image $R_{l-1}^{\mu}$ and a number of channels of the noise image.

It should be noted that a resolution of the noise image is the same as that of the to-be-processed image $I_{l-1}$. Therefore, when the total number of times of the iteration of the resolution enhancement procedure performed by the generative network is greater than 1, in the generative network training procedure, each of the first input image and the second input image provided for the generative network may include the first-resolution sample image and a plurality of noise sample images having different resolutions; or each of the first input image and the second input image may include the first-resolution sample image and one noise sample image, and when the resolution enhancement procedure is iterated for the $l^{th}$ time, the generative network generates the noise sample image at a required magnification according to an amplitude of a noise sample.

The interpolation module 31 is configured to perform interpolation on the to-be-processed image $I_{l-1}$ to obtain a fourth-resolution image based thereon, the fourth-resolution image having a resolution of 512×512. The interpolation module may perform the interpolation by using traditional interpolation methods, such as bicubic interpolation. The resolution of the fourth-resolution image is higher than that of the to-be-processed image $I_{l-1}$.

The second analysis module 12 is configured to generate a feature image of the fourth-resolution image, a number of channels of the feature image being greater than that of the fourth-resolution image.

The first downsampling module 51 is configured to downsample the feature image of the fourth-resolution image to obtain a first downsampled feature image having a resolution of 256×256.

The second concatenating module 22 is configured to concatenate the first merged image $RC_{l-1}^{\mu}$ and the first downsampled feature image to obtain a second merged image.

The first upsampling module 41 is configured to upsample the second merged image to obtain a first upsampled feature image $R_l^0$.

The residual correction system for iteration is configured to perform residual correction on the first upsampled feature image through back-projection for at least one time, so as to obtain a residual-corrected feature image.

The residual correction system for iteration includes a second downsampling module 52, a second upsampling module 42, and a residual determination module 60. The second downsampling module 52 is configured to downsample a received image by 2 times, and the second upsampling module 42 is configured to upsample a received image by 2 times; and the residual determination module 60 is configured to determine a difference image between two received images.

In first residual correction, the first upsampled feature image $R_l^0$ is downsampled by 2 times by the first one second downsampling module 52 to obtain a feature image $R_l^{01}$; the feature image $R_l^{01}$ is downsampled by 2 times by the second one second downsampling module 52 to obtain a feature image $R_l^{02}$ having a same resolution as the initial input image; then, one residual determination module is used to obtain a difference image between the feature image $R_l^{02}$ and the first merged image $RC^\mu{}_0$ obtained in the first time of the resolution enhancement procedure (i.e., the first merged image $RC^\mu{}_0$ obtained by merging the feature image of the initial input image and a noise image); then, the difference image is upsampled by the second upsampling module to obtain a feature image, and the obtained upsampled feature image is superposed on the feature image $R_l^{01}$ by the superposition module 70, so as to obtain a feature image $R^{03}{}_l$ having a same resolution as a first merged image $R^l{}_{l-1}$; then, another residual determination module is used to obtain a difference image between the feature image $R^{03}{}_l$ and the first merged image $RC^\mu{}_{l-1}$; then, the difference image is upsampled by 2 times by the second upsampling module 42 to obtain an upsampled image, and the upsampled image is superposed on the first upsampled feature image $R_l^0$, so as to obtain a feature image $R_l^1$ subjected to the first residual correction.

Then, the feature image $R_l^1$ may be subjected to the second residual correction in the same way to obtain a feature image $R_l^2$ subjected to the second residual correction; and the feature image $R_l^2$ may be subjected to the third residual correction in the same way, and so on. In FIG. 3, μ represents a number of times of the residual correction.

The generative network further includes a synthesis module 80 configured to synthesize a feature image $R_l^\mu$ obtained after a plurality of times of residual correction, so as to obtain a fifth-resolution image, a number of channels of the fifth-resolution image being the same as that of the fourth-resolution image; and the fifth-resolution image and the fourth-resolution image are superposed to obtain an output image $I_l$ after the resolution enhancement procedure is performed for the $l^{th}$ time. A resolution of the fifth-resolution image is the same as that of the fourth-resolution image.

In the generative network, the first analysis module 11, the second analysis module 12, the first upsampling module 41, the second upsampling module 42, the first downsampling module 51, the second downsampling module 52, and the synthesis module 80 can perform corresponding functions through a convolutional layer.

The second time of the resolution enhancement procedure in an iteration process is illustrated above by an example of l=2; and other times of the resolution enhancement procedure are similar to the second time, and thus will not be described in detail herein.

The present disclosure further provides a computer device including a memory having computer programs stored thereon, and a processor, and the above training method for generative adversarial network is performed when the computer programs are executed by the processor.

The present disclosure further provides a computer-readable storage medium having computer programs stored thereon, and the above training method for generative adversarial network is performed when the computer programs are executed by a processor.

The above memory and computer-readable storage medium include, but are not limited to, the following readable media: random access memories (RAMs), read-only memories (ROMs), non-volatile random access memories (NVRAMs), programmable read-only memories (PROMs), erasable programmable read-only memories (EPROMs), electrically erasable programmable read-only memories (EEPROMs), flash memories, magnetic or optical data memories, registers, magnetic disks or tapes, optical storage media such as compact discs (CDs) or digital versatile discs (DVDs), and other non-transitory media. Examples of the processor include, but are not limited to, a general-purpose processor, a central processing unit (CPU), a microprocessor, a digital signal processor (DSP), a controller, a microcontroller, a state machine, etc.

It should be understood that the above embodiments are merely exemplary embodiments for illustrating the principles of the present disclosure, and the present disclosure is not limited thereto. Without departing from the spirit and essence of the present disclosure, various changes and modifications can be made by those skilled in the art, and should be considered to fall within the scope of the present disclosure.

What is claimed is:

1. A training method for a generative adversarial network, the generative adversarial network comprising a generative network and a discriminative network, the generative network being configured to convert a first-resolution image into a second-resolution image, a resolution of the second-resolution image being higher than that of the first-resolution image, and the training method comprising a generative network training procedure, which comprises:

extracting a first-resolution sample image from a second-resolution sample image, with a resolution of the second-resolution sample image higher than that of the first-resolution sample image;

separately providing a first input image and a second input image for the generative network to generate a first output image based on the first input image, and a second output image based on the second input image respectively; wherein, the first input image comprises the first-resolution sample image and a first noise image corresponding to a noise sample with a first amplitude; the second input image comprises the first-resolution sample image and a second noise image corresponding to a noise sample with a second amplitude; and the first amplitude is greater than 0, and the second amplitude is equal to 0;

separately providing the first output image and the second-resolution sample image for the discriminative network to allow the discriminative network to output a first discrimination result based on the first output image, and a second discrimination result based on the second-resolution sample image; and adjusting parameters of the generative network to reduce a loss function of the generative network, wherein the loss function of the generative network comprises a first loss, a second loss and a third loss, the first loss is based on a reconstruction error between the second output image and the second-resolution sample image; the second loss is based on a perceptual error between the first output image and the second-resolution sample image; and the third loss is based on the first discrimination result and the second discrimination result.

2. The training method of claim 1, wherein the reconstruction error between the second output image and the second-resolution sample image is determined according to any one of L1 norm of a difference image matrix between the second output image and the second-resolution sample image, a mean square error between the second output image and the second-resolution sample image, and a structural similarity index between the second output image and the second-resolution sample image.

3. The training method of claim 1, wherein both the first output image and the second output image are generated by the generative network through an iteration process of a resolution enhancement procedure, and the first loss of the loss function of the generative network is $\lambda_1 L_{rec}(X, Y_{n=0})$, and $$L_{rec}(X, Y_{n=0}) = E\left[\sum_{l=1}^{L} \|Y_{n=0}^l - HR^l\|_1\right] + E\left[\sum_{l=1}^{L} \|D_{bio}^l(Y_{n=0}^l) - LR\|_1\right]$$

where X denotes the second-resolution sample image;
$Y_{n=0}$ denotes the second output image;
$L_{rec}(X, Y_{n=0})$ denotes the reconstruction error between the second output image and the second-resolution sample image;
L denotes a total number of times of the resolution enhancement procedure in the iteration process, and L≥1;
$Y_{n=0}^l$ denotes an image generated at the end of the $l^{th}$ time of the resolution enhancement procedure in the iteration process performed by the generative network based on the second input image, and l≤L;
LR denotes the first-resolution sample image;
$D_{bic}^l(Y_{n=0}^l)$ denotes an image obtained by downsampling $Y_{n=0}^l$, a resolution of the image being the same as that of the first-resolution sample image;
$HR^l$ denotes an image obtained by downsampling the second-resolution sample image, a resolution of the image being the same as that of $Y_{n=0}^l$;
E[ ] denotes calculation of matrix energy; and
$\lambda_1$ is a preset weight.

4. The training method of claim 3, wherein the second loss of the loss function of the generative network is $\lambda_2 L_{per}(X, Y_{n=1})$, and $$L_{per}(X, Y_{n=1}) = E\left[\sum_{l=1}^{L} L_{CX}(Y_{n=1}^l, HR^l)\right] + E\left[\sum_{l=1}^{L} L_{CX}(D_{bic}^l(Y_{n=1}^l), LR)\right]$$

where, $Y_{n=1}$ denotes the first output image;
$L_{per}(X, Y_{n=1})$ denotes the perceptual error between the first output image and the second-resolution sample image;
$Y_{n=1}^l$ denotes an image generated at the end of the $l^{th}$ time of the resolution enhancement procedure in the iteration process performed by the generative network based on the first input image;
$D_{bic}^l(Y_{n=1}^l)$ denotes an image obtained by downsampling $Y_{n=1}^l$, a resolution of the image being the same as that of the first-resolution sample image;
$L_{CX}(\ )$ is a contextual loss calculation function; and
$\lambda_2$ is a preset weight.

5. The training method of claim 4, wherein the third loss of the loss function of the generative network is $\lambda_3 L_{GAN}(Y_{n=1})$, and $$L_{GAN}(Y_{n=1}) = E[\log(1 - D(Y_{n=1}^{1,2,\cdots L}))] + E[\log(D(HR^{1,2,\cdots L}))]$$

where, $Y_{n=1}^{1,2,\cdots L}$ denotes an image group generated in the iteration process performed by the generative network based on the first input image, the image group comprising images each generated at the end of each time of the resolution enhancement procedure;
$HR^{1,2,\cdots L}$ denotes images obtained by downsampling the second-resolution sample image, the images being in one-to-one correspondence with the images in $Y_{n=1}^{1,2,\cdots L}$, and each having a resolution the same as that of the corresponding image;
$D(Y_{n=1}^{1,2,\cdots L})$ denotes the first discrimination result;
$D(HR^{1,2,\cdots L})$ denotes the second discrimination result; and
$\lambda_3$ is a preset weight.

6. The training method of claim 5, wherein $\lambda_1:\lambda_2:\lambda_3=10:0.1:0.001$.

7. The training method of claim 1, wherein the noise sample is random noise.

8. The training method of claim 1, further comprising a discriminative network training procedure, which comprises: separately providing the first output image and the second-resolution sample image for the discriminative network to allow the discriminative network to output a discrimination result based on the first output image and a discrimination result based on the second-resolution sample image, respectively; and adjusting parameters of the discriminative network to reduce a loss function of the discriminative network; and
the discriminative network training procedure and the generative network training procedure are alternately performed until a preset training condition is met.

9. The training method of claim 8, wherein,
both the first output image and the second output image are generated by the generative network through an iteration process of a resolution enhancement procedure, and a total number of times of the resolution enhancement procedure in the iteration process is L; and when L is greater than 1, in previous L−1 times of the resolution enhancement procedure in the iteration process performed by the generative network based on the first input image, the generative network generates an intermediate image each time the resolution enhancement procedure is performed; and
in the discriminative network training procedure, each intermediate image generated by the generative network based on the first input image is provided for the discriminative network, while the first output image is being provided for the discriminative network; and while the second-resolution sample image is being provided for the discriminative network, third-resolution sample images obtained by downsampling the second-resolution sample image are provided for the discriminative network, the third-resolution sample images being in one-to-one correspondence with intermediate images, and each having a resolution the same as that of the corresponding intermediate image.

10. An image processing method using the generative network of the generative adversarial network obtained by the training method of claim 1, wherein the image processing method is used for increasing a resolution of an image, and comprises:
providing an input image and a noise image corresponding to reference noise for the generative network to allow the generative network to generate a second-resolution image based on the input image.

11. The image processing method of claim 10, wherein an amplitude of the reference noise ranges from 0 to the first amplitude.

12. The image processing method of claim 10, wherein the reference noise is random noise.

13. A computer device, comprising a memory having computer programs stored thereon, and a processor, wherein the training method of claim 1 is performed when the computer programs are executed by the processor.

14. A non-transitory computer-readable storage medium having computer programs stored thereon, wherein the training method of claim 1 is performed when the computer programs are executed by a processor.

* * * * *